Figure 3:
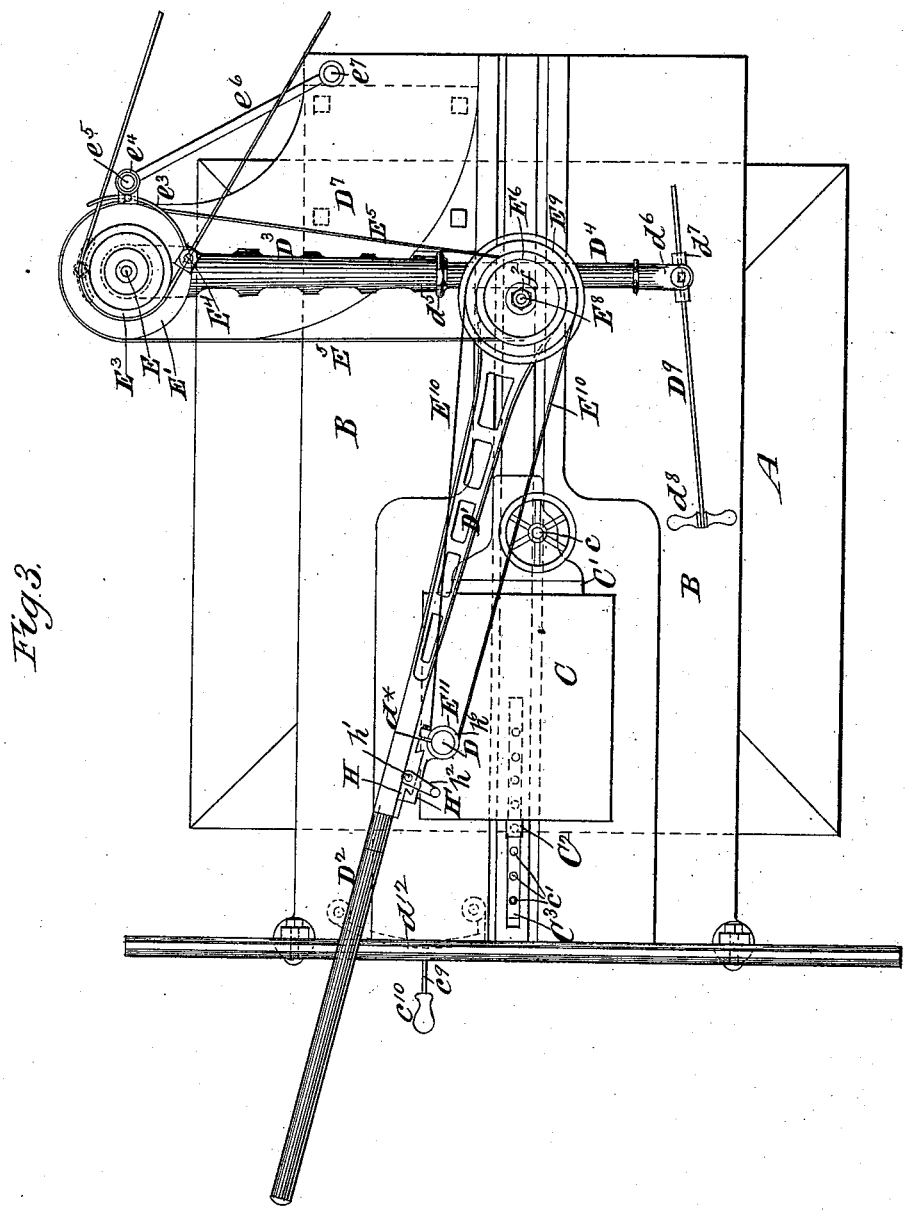

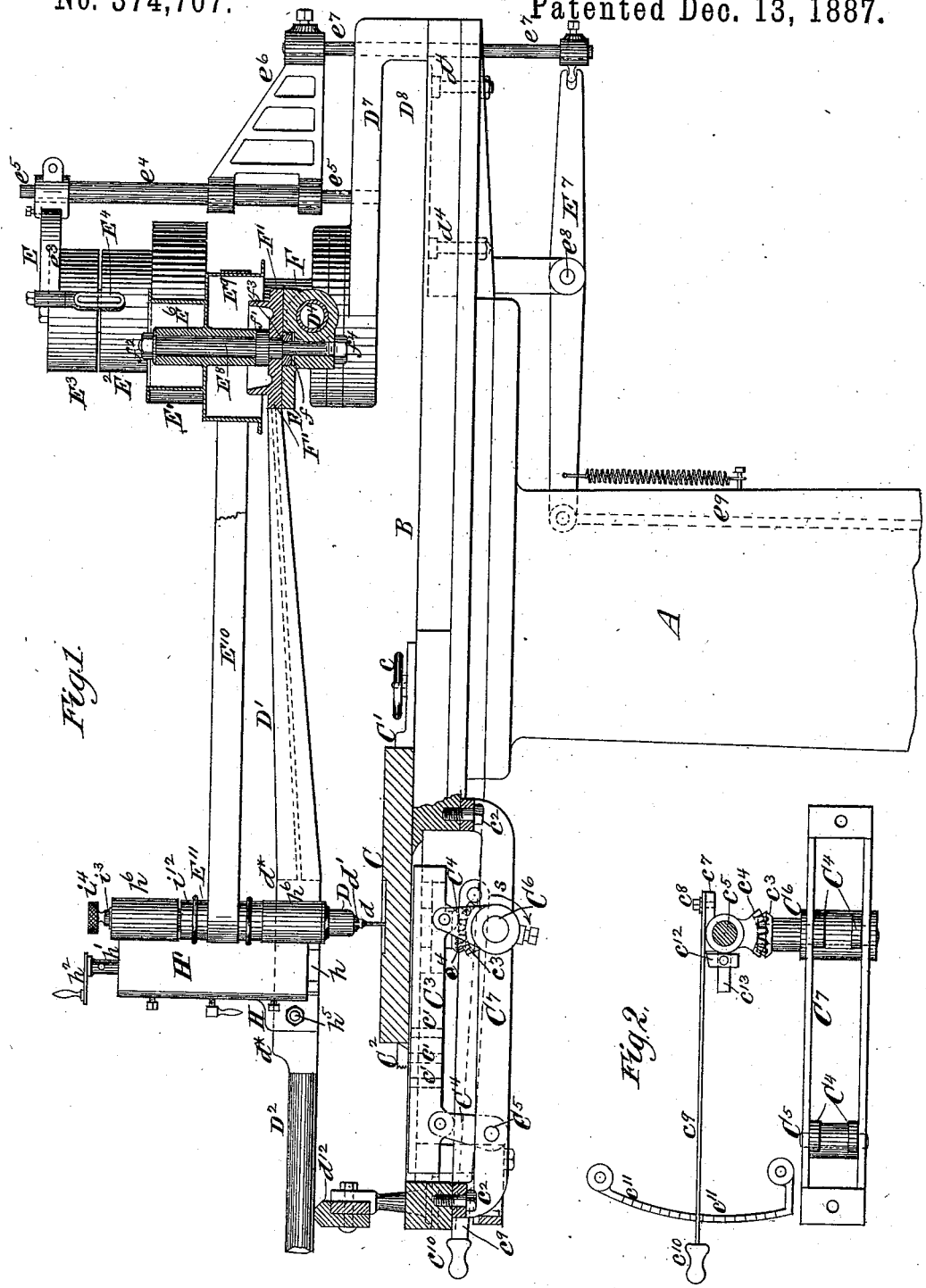

(No Model.) 5 Sheets—Sheet 2.

V. ROYLE & J. ROYLE, Jr.
ROUTING MACHINE.

No. 374,707. Patented Dec. 13, 1887.

Witnesses:
Inventors:

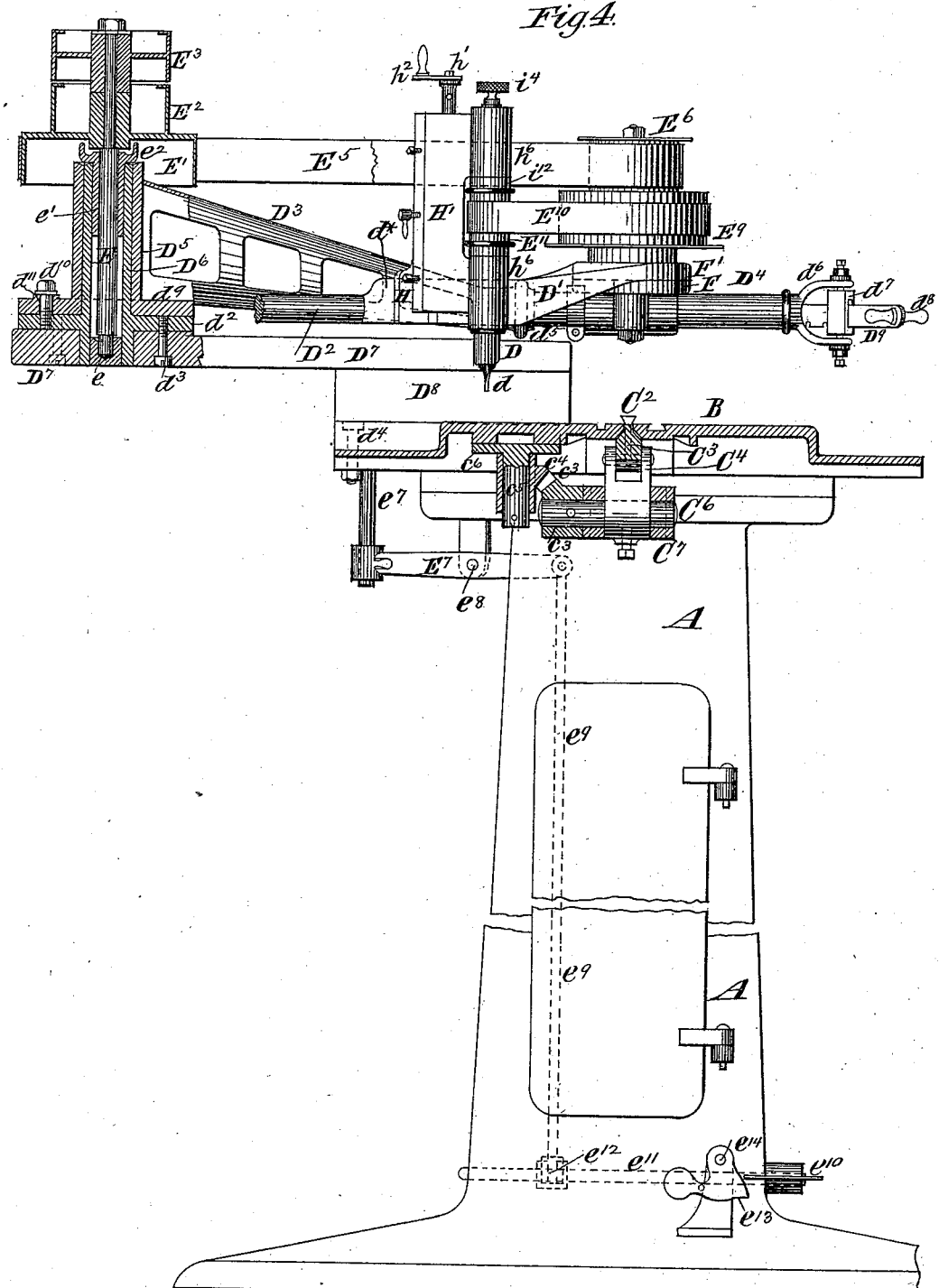

(No Model.) 5 Sheets—Sheet 4.
V. ROYLE & J. ROYLE, Jr.
ROUTING MACHINE.
No. 374,707. Patented Dec. 13, 1887.
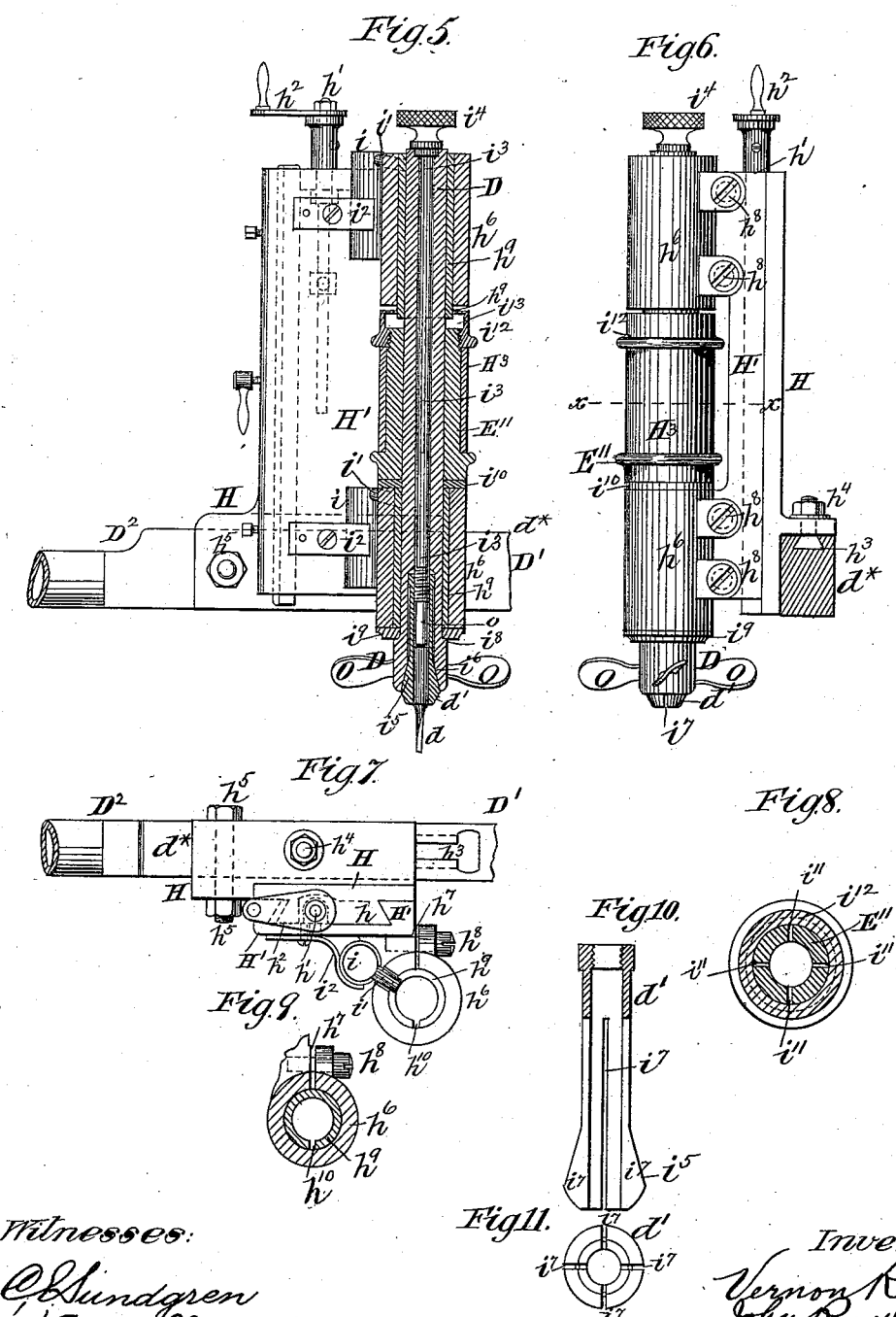

(No Model.) 5 Sheets—Sheet 5.
V. ROYLE & J. ROYLE, Jr.
ROUTING MACHINE.
No. 374,707. Patented Dec. 13, 1887.
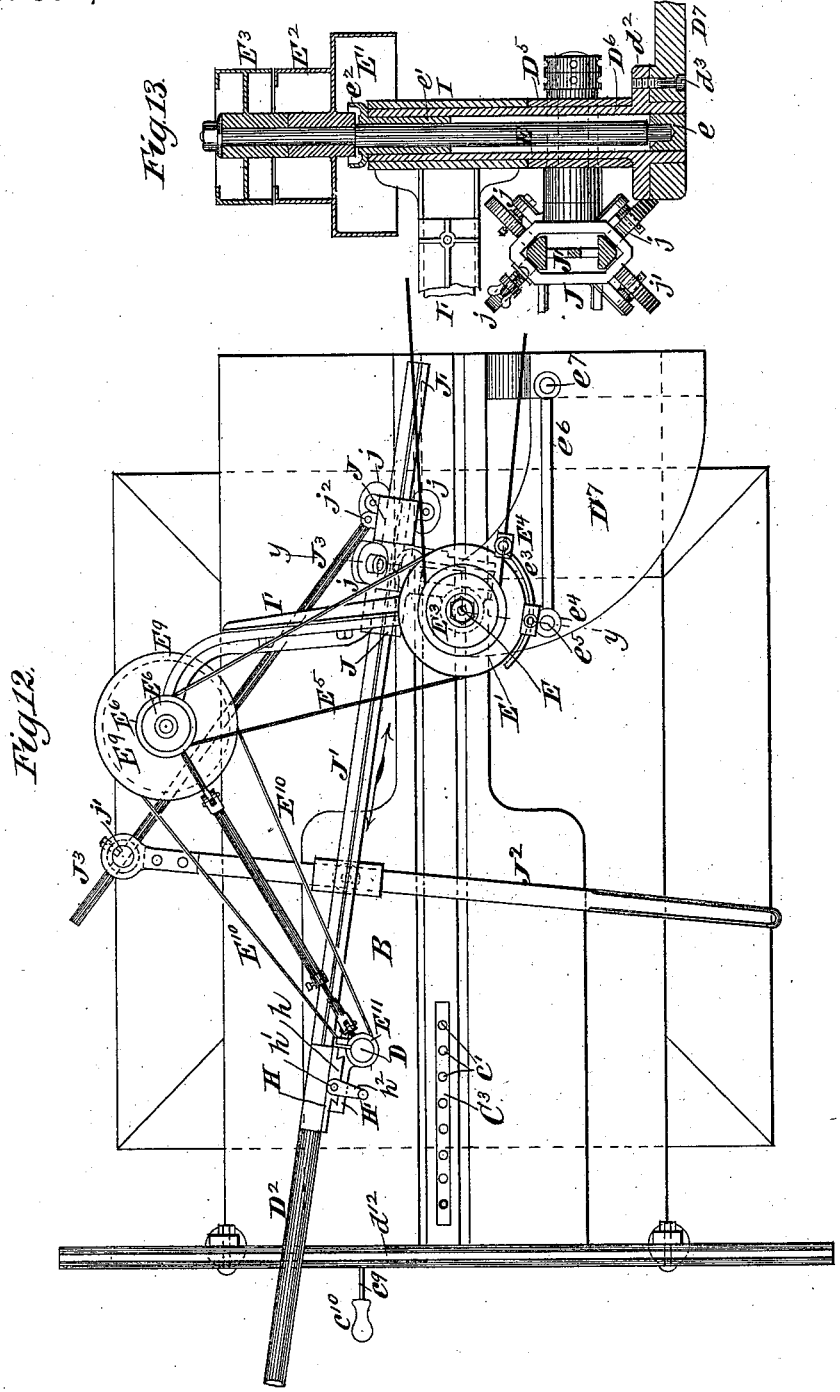
Witnesses:
O. E. Sundgren.
Emil Herter.
Inventors:
Vernon Royle
John Royle Jr.
by their attys
Brown & Hall

UNITED STATES PATENT OFFICE.

VERNON ROYLE AND JOHN ROYLE, JR., OF PATERSON, NEW JERSEY.

ROUTING-MACHINE.

SPECIFICATION forming part of Letters Patent No. 374,707, dated December 13, 1887.

Application filed June 13, 1887. Serial No. 241,124. (No model.)

*To all whom it may concern:*

Be it known that we, VERNON ROYLE and JOHN ROYLE, Jr., both of Paterson, in the county of Passaic and State of New Jersey, have invented a new and useful Improvement in Routing-Machines, of which the following is a specification.

The invention relates to routing-machines for use by engravers on wood, metal, and other surfaces, and in which a rotating cutter capable of being raised and lowered is carried by a spindle upon a jointed lever; and the invention relates to those machines which are termed "elbow" machines, and in which the cutter is maintained upon one arm which is jointed to another arm, the latter being pivoted at its end to an upright post, so as to accomplish every movement by the swinging of such arms, and in part to what are known as "straight-line" machines, in which the cutter is mounted upon an arm capable of sliding lengthwise in a carriage or support having a pivotal center.

Certain features of our invention relate to a novel means for applying a movable dog or work-clamp which, in connection with the fixed dog or work-clamp, serves to hold the work upon a table. The operating-handle, which engages with a notched bar in the means which make up these combinations of parts, is elastic and constitutes a spring through which the handle operates to move the dog or clamp, and the spring has an adjustable bearing for varying the elasticity of the handle-arm, and by which the elastic handle-arm is supported at any desired distance from its end and the length of its elastic portion is varied, as may be desired. In these combinations of parts the bar which carries the movable dog or clamp is supported by rock-shafts and swinging arms to provide for its parallel motion, and on one of these rock-shafts is a bevel gear-sector, with which engages a master-sector having a vertical axis, and a horizontally-swinging lever or handle for operating this master-sector in a horizontal plane.

The invention also consists in other novel combinations of parts, including a novel construction of bearings for an upright shaft or spindle, and for an arm which is pivoted concentric therewith. They also consist in a novel construction of this pivoted first arm of the machine. Such novel combinations also include a novel construction of the bearing or pivotal joint which connects the first and second arms, and which enables such bearing or joint to be adjusted so as to prevent lost motion in the pivotal connection, notwithstanding wear to which it may be subjected. The novel combinations of parts also include a novel construction of the second arm of the machine. The novel combinations of parts also include novel features in the construction of the clamp or chuck, in the work-spindle which holds the rotating cutter, and in the appliances which are used in connection therewith, as hereinafter particularly described, and pointed out in the claims.

In the accompanying drawings, Figure 1 is a partly sectional elevation of a machine embodying our invention and in which are employed two arms jointed together, and the first arm pivoted at the end for enabling the cutting-tool or cutter to have a universal motion imparted to it. Fig. 2 is a plan and horizontal section of such parts as are necessary to show the means for operating the movable work dog or clamp. Fig. 3 is a plan of the machine. Fig. 4 is a front elevation thereof, including a sectional view of the mechanism for operating the work-dog and of the joint and bearing for the first arm. Fig. 5 is a sectional elevation of the cutter-spindle, together with its appurtenances. Fig. 6 is an elevation of the cutter-spindle and appurtenances in a plane at right angles to Fig. 5, including a transverse section of the second arm. Fig. 7 is a plan of the parts shown in Figs. 5 and 6. Fig. 8 is a tranverse section upon about the plane indicated by the dotted line $x\ x$, Fig. 6, of the pulley which controls the cutter-spindle. Fig. 9 is a horizontal section of one of the bearings which supports the cutter-spindle. Figs. 10 and 11 are a longitudinal section and an end view, upon a larger scale, of the chuck which holds the cutter; and Fig. 12 is a plan, and Fig. 13 a vertical section on about the plane indicated by the dotted line $y\ y$, Fig. 12, of a straight-line machine embodying certain features of the invention.

Similar letters of reference designate corresponding parts in all the figures.

Referring first to Figs. 1 to 11, inclusive, A designates a hollow standard of cast metal, on which is supported a horizontally-extending table or frame, B, constituting a work-table. This frame constitutes a work-table, whereon the work, C, is secured by means of a stationary clamp or dog, C', which is adjustable to suit work of different sizes, and which after adjustment is secured by a screw and hand wheel, c. In connection with the fixed dog C' we employ a movable or adjustable work-dog, $C^2$, which has a shank adapted to be inserted within a series of holes, c', formed in an upper bar, $C^3$. This bar $C^3$ is carried by means of arms $C^4$, arranged in pairs and mounted upon rock-shafts $C^5$ $C^6$. The rock-shafts are journaled in a hanger or bracket, $C^7$, which is secured by bolts $c^2$ upon the under side of the table or frame B, as best shown in Fig. 1, and which are also represented, together with the rock-shaft and arms, in Fig. 2. It will be readily understood from the above description that any movement of one rock-shaft, $C^6$, in the direction of the arrow s in Fig. 1, will move the clamping-dog $C^2$ against the work, C, and will press the latter in contact with the fixed dog C'.

Each pair of arms $C^4$ may be made as one integral casting, the two arms projecting from a hub which is journaled upon a pin; but the same result would follow if each pair of arms were fastened directly to the pin, and the pins $C^5$ $C^6$, upon which the arms turn, we have designated as "rock-shafts." Upon one of the rock-shafts, $C^6$, is a bevel gear-segment, $c^3$, and adjacent thereto and engaging therewith is a second segment, $c^4$, which constitutes a master-segment, rotating in a horizontal plane upon a vertical axis, $c^5$. This axis $c^5$, as best represented in Fig. 4, may have a flange, $c^6$, whereby it is bolted to the under side of the table B, and upon this pin or axis $c^5$ may turn the master-segment $c^4$. The master-segment $c^4$ has a tangential arm, $c^7$, to which is secured at $c^8$ a handle-arm, $c^9$, provided at the end with a handle, $c^{10}$, and this handle-arm or handle is elastic or yielding and constitutes a spring which is capable of engagement with the notched bar $c^{11}$ to hold it in different positions to which it may be adjusted. The tangential projection $c^7$ affords a flat surface for the spring handle-arm $c^9$ to bear against, and the extent of this surface may be increased by sliding a collar, $c^{12}$, upon the projection $c^{13}$ from the master-segment, and thereby offer a shorter length of the arm which is elastic. By moving the collar backward or forward upon the projection $c^{13}$ it will be seen that the length of the handle-arm which is made available for purposes of elasticity may be increased or diminished, as may be desired, to give the movable dog $C^2$ the desired and most effective hold upon the work, and to enable the handle-arm $c^9$ to be engaged with any tooth desired of the notched bar $c^{11}$, and so hold the dog $C^2$ firmly upon the work.

d designates a rotary cutter which is clamped in a chuck, d', hereinafter described, carried by the rotary cutter-spindle D. The cutter-spindle D is supported directly by an arm, D' $D^2$, which is jointed to another or first arm, $D^3$ $D^4$, and this first arm has its portion $D^3$ constructed with a socket or sleeve, $D^5$, which surrounds a post, $D^6$. The post $D^6$ may have a flange, $d^2$, whereby it is secured through proper screws, $d^3$, to the upper portion of a bracket, $D^7$, secured by screws $d^4$, or bolts, upon the table B. This bracket $D^7$ is constructed with a gap or recess, $D^8$—that is to say, it is in the form of a U laid upon its side—and the upper portion of the bracket $D^7$ greatly overhangs the table or bed B and brings the support of the arm $D^3$ $D^4$ nearer to the cutter-spindle D, while at the same time it permits of sufficient room for the reception of work into the bracket and beneath the overhanging portion.

The arm $D^3$ $D^4$ is of peculiar construction, inasmuch as its portion $D^3$ consists of a hollow casting, (shown best in Fig. 4,) and constructed with a socket or sleeve, $D^5$, and the portion $D^4$ of said arm consists of a pipe or cylindric rod screwed or otherwise secured into the casting at the point $d^5$ and projecting beyond the same. The extremity of the arm $D^4$, which is constructed of pipe, may be forked, as shown at $d^6$, and have pivoted within it a block, $d^7$, which can swing freely in a horizontal plane, and through which passes a handle-bar, $D^9$, constructed with a handle, $d^8$, and notched at its lower edge to engage the block $d^7$. This construction of the handle-bar $D^9$ is similar to that shown in our Letters Patent No. 193,555, granted July 24, 1877, and we therefore make no special claim to its construction. The post $D^6$ is hollow, and the socket or sleeve $D^5$, mounted thereon has likewise a flange, $d^9$, which is capable of turning on the flange $d^2$, and the turning movement is limited by a screw, $d^{10}$, passing through a slot, $d^{11}$, in the flange $d^9$. The flange $d^9$ gives a broad bearing for the sleeve or socket $D^5$, and the arm $D^3$ $D^4$ can therefore be swung readily upon the post $D^6$ as may be desired. The projection $D^2$ of the arm D' consists simply of a handle-bar, which may be hollow, and which is free to slide upon the top of a guide, $d^{12}$, so as to take the weight of the parts off the rotary cutter.

Within the hollow post $D^6$ is arranged a central or driving shaft, E, which may be fitted to a bearing-block constituting a step-bearing, e, fitted in the lower part of the post, and which at its upper portion is fitted as a journal to a bearing, e', secured as a bushing within the upper part of the post. Upon the shaft or spindle E is secured a pulley, E', which has formed integral with it or rigidly secured to it a pulley, $E^2$, and above the pulley $E^2$ is a third pulley, $E^3$, which is secured to the shaft E. The pulleys E' $E^2$ may be rotated as one piece upon the shaft, and the top of the bearing e' is constructed with a cup, $e^2$, to receive the grease, the hub of the combined pulleys E' $E^2$ entering somewhat into this cup. The pulley $E^3$ may be fast or loose upon the driving-shaft E, as may be desired, and by means of a belt-shipper, $E^4$, a driving-belt may be shifted from the pulley $E^3$ onto the pulley $E^2$, and vice versa. When the belt is shifted onto the pulley $E^2$, the pulley $E'$, through a belt, $E^5$, transmits motion to a pulley, $E^6$, mounted upon a turn-table connection between the arm $D^3 D^4$ and the arm $D' D^2$. The belt-shipper $E^4$ is carried by an arm, $e^3$, from a sleeve, $e^4$, which is mounted upon a guiding-rod, $e^5$, and on the sleeve $e^4$ is an arm, $e^6$, through which said sleeve and the shipper $E^4$ upon it may be raised by a rod, $e^7$. The lower end of the rod $e^7$, which is guided in the table or base B, has connected with it a lever, $E^7$, fulcrumed at $e^8$, and with the opposite end of which is connected a rod, $e^9$, leading downward to a treadle, $e^{10}$. (Shown in Fig. 4.) The treadle is upon a rock-shaft, $e^{11}$, and the rod $e^9$ is connected with an arm, $e^{12}$, upon said rock-shaft. When the treadle $e^{10}$ is pushed down, it passes beneath and is retained by a latch, $e^{13}$, pivoted at $e^{14}$, but which by gravity assumes the position shown in Fig. 4.

The construction of the turn-table connection between the arms $D' D^2$ and $D^3 D^4$ is best shown in Fig. 1. This turn-table connection consists of a lower part or portion, F, fitted to slide upon the pipe-extension $D^4$ of the arm $D^3$, and constructed with a broad flat upper surface, and an upper portion, F', which forms a part of the arm $D' D^2$. The part D' is broad at the part F', as best shown in Figs. 3 and 1, and of little depth; but at the farther end and nearer the rotary cutter-spindle D it is of less width and increased depth, as best shown in Fig. 1. The pulley $E^6$, which rotates upon a fixed spindle, $E^8$, has formed integral with it another pulley, $E^9$, from which a belt, $E^{10}$, passes to a pulley, $E^{11}$, upon the cutter-spindle D. Within the lower part, F, of the turn-table connection is fitted as a screw-threaded plug a bearing piece or washer, $f$, and an upright spindle, which constitutes a central post on which the pulleys $E^6 E^9$ turn, is shouldered at $f'$, and provided with a nut, $f^2$, for securing the pulleys upon it, and is shouldered again at $f^3$ to bear upon the piece $f$, and thence projects downward through the part F, which slides upon the bar or pipe $D^4$, and is provided at the bottom with a nut, $f^4$, for tightly securing it in place.

Now, it is obvious that if the shoulder $f^3$ bear upon the face of the part F, the facing-off of the parts F F' would reduce the thickness of the parts through which the spindle or post $E^8$ extends; but when this occurs the plug or bearing-piece $f^8$ is correspondingly set down within the part F, and provision is afforded for securing the post $E^8$ firmly in the part F, and at the same time enabling it to hold the part F' securely in place, so as to permit it to turn relatively to the part F and still prevent its wabbling on said part. However much it may be necessary, owing to the increased wear, to cut away from the faces of the parts F F', the part F' may always be prevented from any wabbling or lost motion on the post $E^8$ by setting down or screwing the bearing-plug $f$ into the part F.

Upon the end of the arm portion $D^2$, which is square or of rectangular form, as at $d^*$, is fitted a stock-piece or upright guide, H, and to a dovetailed projection or gib, $h$, upon this guide a slide, H', may be moved by an upright screw, $h'$, operated by a handle, $h^2$. No special description of these parts is necessary, as they are very similar to the slide-rest upon an ordinary lathe. The part $d^*$ of the arm has a dovetailed groove, $h^3$, wherein is fitted a correspondingly-headed bolt, $h^4$, which secures the stock-piece H upon the arm in any desired position. This stock-piece is also secured by bolts $h^5$, which project transversely through it and the arm $D^2$, as best shown in Figs. 5 and 7.

Upon the slide H' are constructed bearings $h^6$ for the cutter-spindle D. The construction of these bearings is best understood from Figs. 5, 6, 7, and 9. Each bearing $h^6$ is split or divided at $h^7$, and by screws $h^8$ is tightly closed upon bushings or linings $h^9$, which are here represented as divided or slotted at $h^{10}$. The bearings $h^6$ and their linings $h^9$ are arranged with the slots or lines of division opposite each other, as shown in Figs. 7 and 9. When the screws $h^8$ are set up so as to tighten the bearings, the bearings are made slightly oval, as will be well understood; but owing to the slots or divisions $h^{10}$ of the linings or bushings $h^9$ being opposite the divisions or slots $h^7$ in the bearings this distortion of form is in a measure corrected and a true cylindric bearing is afforded for the cutter-spindle D. A lubricant is supplied to the cutter-spindle from oil-cups $i$, provided with feeding-tubes $i'$, by capillary traction, and the oil-cups $i$ are held in place each by a clamp, $i^2$, in a well-understood manner.

The cutter-spindle D is hollow, and through it extends a rod, $i^3$, provided with a head, $i^4$, whereby it may be turned to engage by a screw-thread the upper end of the split chuck $d'$, which receives the cutter $d$. The split chuck $d'$ has its lower end, which is tapered at $i^5$ and which fits a corresponding taper-seat, $i^6$, in the end of the cutter-spindle, split or slotted at $i^7$, and consequently when, by turning the rod $i^3$, the chuck is drawn upward into the cutter-spindle D the elastic jaws thereof are tightened upon the shank of the cutter $d$, and the chuck is thereby held securely in place.

Upon the cutter-spindle D is a shoulder, $i^8$, above which is a washer, $i^9$, bearing upon the end of the bearing $h^6$. Above the lower bearing $h^6$ is another washer, $i^{10}$, and above this washer a pulley, $E^{11}$, is clamped upon the spindle D. The body of this pulley may be split or slotted, as at $i^{11}$, and by a nut, $i^{12}$, applied to its hub, may be contracted tightly upon the spindle D. The nut $i^{12}$ may be constructed so as to form an oil-cup, $i^{13}$, into which the bushing $h^9$ of the upper bearing projects, and the pulley $E^{11}$ may have a tubular sleeve or covering, $H^3$, secured in place between the nut $i^{12}$ and the shoulder at the bottom of the pulley. In this way the parts are assembled so as to compensate for wear and so as to prevent the longitudinal movement of the cutter-spindle D in case of any lost motion.

In the example of the invention shown in Figs. 12 and 13 the upper portion of the bracket $D^7$ has projecting upward from it a hollow post, $D^6$, and within this hollow post is arranged the spindle or counter-shaft E, which is fitted to the bearings $e$ $e'$, consisting of blocks or bushings inserted in the post. Upon the upper end of the shaft or spindle E are mounted the pulleys $E'$ $E^2$, formed integral with each other, and a loose pulley, $E^3$, as previously described with reference to Fig. 4. The hollow post has a flange, $d^2$, whereby it is bolted by screws $d^3$ to the bracket or hanger $D^7$, and the post has mounted upon its exterior two sleeves or sockets, $D^5$ I, the purpose of which will soon be described. The sleeve $D^5$ has arranged upon it a transversely-projecting shank and slideway, J, provided with rollers $j$, which guide and support a bar, $J'$, and upon this bar is mounted a cutter-spindle, D, in a manner similar to that described with reference to the preceding figures. The edges of the bar $J'$ bear upon the rollers $j$ and provide for the sliding of such bar in the direction of the double-headed arrows shown in Fig. 12 with as little friction and resistance as possible. From the sleeve or socket I projects an arm, $I'$, carrying a spindle on which are two pulleys, $E^6$ $E^9$, similar to those before described. From the pulley $E'$ a belt, $E^5$, transmits motion to the pulley $E^6$, and from the pulley $E^9$ a belt, $E^{10}$, transmits motion to the pulley $E^{11}$ upon the cutter-spindle D.

$J^2$ designates a handle-bar which at one end has a pivotal and sliding connection, $j'$, with a bar, $J^3$, which is pivoted at $j^2$ to the carriage J, and by means of the handle-bar $J^2$ the bar $J'$ may be slid lengthwise through the carriage J, while by means of such bar or arm $J'$, which has an extension, $D^2$, bearing upon the track or way $d^{12}$, the bar $J'$ may be swung to and fro in a direction transverse to its width, and the belts $E^5$ $E^{10}$ meanwhile accommodate themselves to changed positions of the spindles to and from which they convey motion.

In order to keep the work free from chips at the point of cutting, we have represented fan-blades as projecting from the spindle D near its lower end, and which serve by the blast of air they produce to blow away the chips or cuttings. In cutting the side strain is all upon one side of the cutter $d$, and to hold it more securely in the chuck $d'$ we have represented the rod $i^3$ as having at the lower end a projection, $o$, which bears against the end of the cutter-shank.

What we claim as our invention, and desire to secure by Letters Patent, is—

1. The combination, with the work-table of a routing or molding machine, of a fixed dog or work-clamp, a movable dog or clamp, and an operating-handle and notched locking-bar for clamping it upon the work, a spring through which the handle operates to move the dog or clamp, and an adjustable bearing for varying the elasticity of the spring, substantially as herein described.

2. The combination, with the work-table and fixed work dog or clamp of a routing or molding machine, of a movable dog or clamp, an elastic lever or handle arm through which said movable dog or clamp is actuated to hold the work, and an adjustable bearing-block through which the elastic lever or arm is supported at any desired distance from its end, and a notched locking-bar for the lever or arm, substantially as herein described.

3. The combination, with the work-table and fixed dog or work-clamp of a routing or molding machine, of a bar carrying a movable dog or clamp and supported by rock-shafts and swinging arms to provide for its parallel motion, a master bevel gear-sector having a vertical axis and engaging a corresponding sector on one of the rock-shafts, and a horizontally-swinging lever or handle for operating said master-sector, substantially as herein described.

4. The combination, with the work-table B and the dog $C'$, of the bar $C^3$, carrying the dog $C^2$, the rock-shafts and arms supporting said bar, the bevel gear sectors $c^3$ $c^4$, the elastic lever or handle arm $c^9$, secured at $c^8$ to the hub of the sector $c^4$, the sliding block $c^{12}$, forming an adjustable bearing for said lever or arm, and the locking-bar $c^{11}$, substantially as herein described.

5. The combination, in a routing or molding machine, of a bracket, as $D^7$, the hollow post $D^6$, mounted thereon, the first arm portion, $D^3$, journaled upon the exterior of the post, and the main shaft or spindle having bearings within the post, substantially as herein described.

6. The combination, in a routing or molding machine, of a supporting-bracket, as $D^7$, the hollow post $D^6$, having a laterally-extending flange at the base, the first arm portion, $D^3$, journaled on the exterior of said post and having a flange which is afforded an extended horizontal bearing on the flange of the post, and a main shaft or spindle journaled within the post, substantially as herein described.

7. In a routing or molding machine, the first arm composed of a hollow casting or body portion, $D^3$, and a cylindrical-extension, $D^4$, therefrom, substantially as herein described.

8. In a routing or molding machine, the combination, with the first and second arms jointed by a turn-table connection, the lower member or plate of which slides upon the first arm, of a shouldered post or shaft secured in said lower member or plate and on which turn the transmitting-pulleys, and the bearing-piece $f$, adjustable relatively to the face of the lower member or plate and against which the shoulder of the post or shaft bears, substantially as herein described.

9. The combination of the first arm and the lower member or plate, F, mounted thereon and containing in its face the adjustable piece $f$, the second arm portion, D', having the plate or turn-table member F', cup-shaped at the top to contain oil, the post or fixed shaft $E^8$, secured in the member or plate F and having a shoulder bearing against the adjustable piece $f$, and the pulleys $E^6$ $E^9$, turning on said post or shaft and having their hub entering the cavity in the plate or member F', substantially as herein described.

10. The combination, with the first arm of a routing or molding machine, of the second arm portion, D', having a turn-table connection with the first arm and increasing in depth, but decreasing in width toward its outer end, where it carries bearings for a cutter-spindle, substantially as herein described.

11. The combination, with the spindle D, having a taper socket or seat, $i^6$, and the fan-blades on its exterior, of the taper and split chuck $d'$, and the rod $i^3$, extending through the spindle and engaging the chuck for drawing it into the taper socket or seat, substantially as herein described.

12. The combination, with a spindle having a taper socket or seat, of a split chuck having an internal thread at its back end and a conical exterior fitting the taper seat, and a rod, $i^3$, extending through the spindle and screw-threaded at the end nearest the cutter to engage the chuck, and having a bearing by its inner threaded end against the end of the shank of a cutter introduced in the chuck, whereby a cutter made separate from the said rod is prevented from working into the chuck, substantially as herein described.

13. The combination, with a cutter-spindle having a shoulder, $i^8$, near its lower end, of upper and lower bearings therefor, and a pulley secured to the spindle between the bearings and serving in connection with the shoulder on the spindle and by bearing against the end of one of the bearings to prevent lengthwise movement of the spindle, substantially as herein described.

VERNON ROYLE.
JOHN ROYLE, JR.

Witnesses:
C. F. MAGER,
SIDNEY FARRAR.